US012812475B2

(12) United States Patent
Dong

(10) Patent No.: US 12,812,475 B2
(45) Date of Patent: Nov. 24, 2026

(54) COMMUNICATION METHOD AND COMMUNICATION APPARATUS

(71) Applicant: Beijing Xiaomi Mobile Software Co., Ltd., Beijing (CN)

(72) Inventor: Xiandong Dong, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 289 days.

(21) Appl. No.: 18/685,452

(22) PCT Filed: Aug. 30, 2021

(86) PCT No.: PCT/CN2021/115413

§ 371 (c)(1),
(2) Date: Feb. 21, 2024

(87) PCT Pub. No.: WO2023/028773

PCT Pub. Date: Mar. 9, 2023

(65) Prior Publication Data

US 2024/0349128 A1 Oct. 17, 2024

(51) Int. Cl.

| | |
|---|---|
| ***H04W 28/20*** | (2009.01) |
| ***H04W 28/06*** | (2009.01) |
| ***H04W 72/1273*** | (2023.01) |
| ***H04W 76/15*** | (2018.01) |

(52) U.S. Cl.

CPC ........... *H04W 28/20* (2013.01); *H04W 28/06* (2013.01); *H04W 72/1273* (2013.01); *H04W 76/15* (2018.02)

(58) Field of Classification Search

CPC . H04W 28/20; H04W 28/06; H04W 72/1273; H04W 76/15; H04W 52/0216; H04W 52/0229; H04W 52/028; H04W 84/12; H04W 52/02

See application file for complete search history.

(56) References Cited

U.S. PATENT DOCUMENTS

| | | | | |
|---|---|---|---|---|
| 2014/0098729 | A1 | 4/2014 | Chhabra et al. | |
| 2020/0137683 | A1 | 4/2020 | Park et al. | |
| 2021/0076413 | A1* | 3/2021 | Lu | H04W 76/15 |
| 2022/0264429 | A1* | 8/2022 | Gan | H04W 28/0221 |
| 2023/0345349 | A1* | 10/2023 | Kim | H04W 48/14 |
| 2024/0056796 | A1* | 2/2024 | Li | H04W 8/24 |
| 2024/0107448 | A1* | 3/2024 | Cariou | H04W 72/0453 |
| 2024/0114573 | A1* | 4/2024 | Ko | H04W 76/15 |
| 2025/0261258 | A1* | 8/2025 | Kim | H04L 67/303 |

FOREIGN PATENT DOCUMENTS

| | | |
|---|---|---|
| CN | 112189329 A | 1/2021 |
| CN | 112788716 A | 5/2021 |
| CN | 113316954 A | 8/2021 |

* cited by examiner

*Primary Examiner* — Schquita D Goodwin
(74) *Attorney, Agent, or Firm* — Volpe Koenig

(57) ABSTRACT

A communication method, electronic device, and computer-readable storage medium that improve bandwidth utilization in a wireless communication system. The utilization is improved by: determining a traffic indication map (TIM) frame in a first link among multi-links, the TIM frame including an ID bit configured to identify a presence of a multi-link traffic element, and the TIM frame containing information configured to identify a condition that a downlink data frame is cached for each of the multi-links; and sending the TIM frame.

13 Claims, 3 Drawing Sheets

COMMUNICATION METHOD AND COMMUNICATION APPARATUS

CROSS-REFERENCE TO RELATED APPLICATION

The present application is a U.S. National Stage of International Application No. PCT/CN2021/115413, filed on Aug. 30, 2021, the contents of all of which are incorporated herein by reference in their entirety for all purposes.

BACKGROUND OF THE INVENTION

Current studies on Wi-Fi technology cover 320 MHz bandwidth transmission, multi-band aggregation, coordination, etc. It is expected at least a fourfold increase in rate and throughput compared with existing standards. The Wi-Fi technology is mainly applied in scenarios of video transmission, augmented reality (AR), virtual reality (VR), etc.

The multi-band aggregation and coordination refers to communication between devices simultaneously at frequency bands of 2.4 GHz, 5 GHz, 6 GHz, etc. A new media access control (MAC) mechanism needs to be defined to manage the communication between devices simultaneously at a plurality of frequency bands. In addition, it is also expected that the multi-band aggregation and coordination can support low-latency transmission.

The current multi-band aggregation and coordination technology can support a maximum bandwidth of 320 MHz (160 MHz+160 MHz), and can also support a bandwidth of 240 MHz (160 MHz+80 MHz) and other bandwidths.

In current technologies, a station (STA) and an access point (AP) may be multi-link devices (MLD), that is, support a function of transmission and/or reception in multi-links. In this case, in the current technologies, there may be multi-links between the STA and the AP, and the communication between the two devices in the multi-links is being studied.

SUMMARY OF THE INVENTION

The present disclosure relates to the field of wireless communication and, more particularly, to a communication method and a communication apparatus.

According to an example of the present disclosure, there is provided a communication method. The communication method may include: determining a traffic indication map (TIM) frame in a first link among multi-links; and sending the TIM frame. The TIM frame may include an ID bit configured to identify the presence of a multi-link traffic element, and the TIM frame may include information configured to identify a condition that a downlink data frame is cached for each of the multi-links.

According to an example of the present disclosure, a communication method is provided. The communication method may include: receiving a traffic indication map (TIM) frame in a first link among multi-links; and performing a communication operation based on the TIM frame. The TIM frame may include an ID bit configured to identify the presence of a multi-link traffic element, and the TIM frame may be configured to identify a condition that a downlink data frame is cached for each of the multi-links.

According to an example of the present disclosure, a communication apparatus is provided. The communication apparatus may include: a processing module, configured to determine a traffic indication map (TIM) frame in a first link among multi-links; and a transceiving module, configured to send the TIM frame. The TIM frame may include an ID bit configured to identify the presence of a multi-link traffic element, and the TIM frame may be configured to identify a condition that a downlink data frame is cached for each of the multi-links.

According to an example of the present disclosure, a communication apparatus is provided. The communication apparatus may include: a transceiving module, configured to receive a traffic indication map (TIM) frame in a first link among multi-links; and a processing module, configured to control the execution of a communication operation based on the TIM frame. The TIM frame may include an ID bit configured to identify the presence of a multi-link traffic element, and the TIM frame may be configured to identify a condition that a downlink data frame is cached for each of the multi-links.

According to an example of the present disclosure, an electronic device is provided. The electronic device includes a memory, one or more processors, and a computer program stored in the memory and runnable on the one or more processors. The computer program, when executed by the one or more processors, causes the one or more processors to collectively implement the method described above.

According to an example of the present disclosure, a non-transitory computer-readable storage medium, storing a computer program, is provided. The computer program, when executed by one or more processors, causes the one or more processors to collectively implement the method described above.

BRIEF DESCRIPTION OF DRAWINGS

The above and other features of the examples of the present disclosure will become more apparent from the detailed description of the examples of the present disclosure with reference to the accompanying drawings.

DETAILED DESCRIPTION OF THE INVENTION

The following descriptions, with reference to the accompanying drawings, are provided to aid in a full understanding of various examples of the present disclosure as defined by the appended claims and their equivalents. The various examples of the present disclosure include various details, but these details are considered to be illustrative. In addition, for the sake of clarity and conciseness, descriptions of well-known techniques, functions, and constructions may be omitted.

Terms and words used in the present disclosure are not limited to written meanings, but are used by the inventors to enable a clear and consistent understanding of the present disclosure. For those skilled in the art, the description of various examples of the present disclosure is provided for illustrative purposes and not for the purpose of limitation.

It needs to be understood that, unless the context clearly stated otherwise, the singular forms “a/an,” “one,” “the,”

and "said" as used may also include a plural form. It needs to be further understood that the expression "include/comprise" used in the present disclosure refers to the presence of the described features, integers, steps, operations, elements and/or components, but cannot preclude the presence or addition of one or more other features, integers, steps, operations, elements, components and/or groups thereof.

It needs to be understood that although the terms "first," "second," and the like may be used to describe various elements, these elements should not be limited to these terms. These terms are used to distinguish one element from another. Without departing from the teachings of the examples of the present disclosure, a first element discussed below may be referred to as a second element.

It needs to be understood that when an element is described as being "linked" or "coupled" to another element, the described element may be directly linked or coupled to the other element, or there may be an intermediate element between the described element and the other element. Moreover, the "linked" or "coupled" as used may include a wireless link or wireless coupling. The term "and/or" or the expression "at least one of" as used includes any and all combinations of one or more related listed items.

All terms (including technical and scientific terms) as used have the same meanings as commonly understood by those of ordinary skill in the art of the present disclosure, unless otherwise defined.

Figure 1:
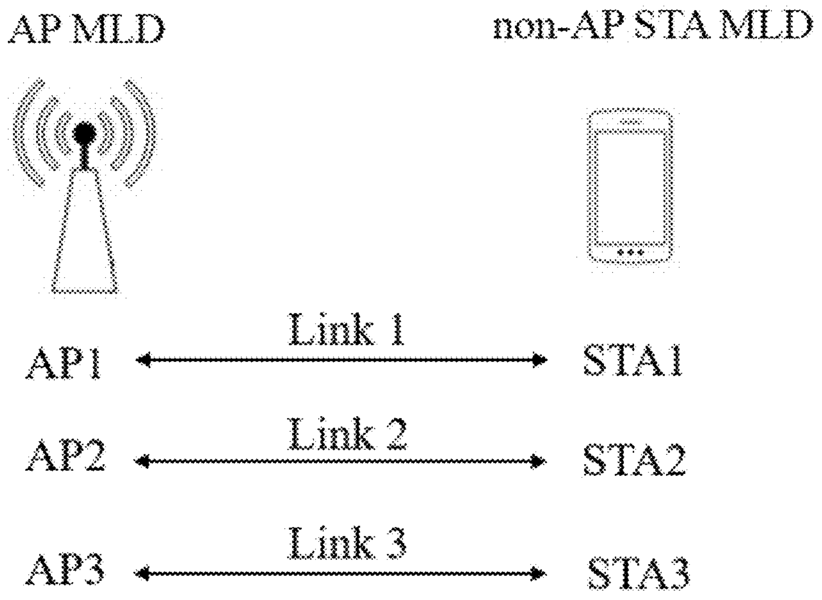
FIG. 1 is a diagram illustrating a communication scenario in multi-links.

FIG. 1 is a diagram illustrating a communication scenario in multi-links.

In a wireless local area network, a basic service set (BSS) may include an AP and one or more STAs communicating with the AP. One BSS may be linked to a distribution system (DS) through its AP, and then linked to another BSS to form an extended service set (ESS).

The AP is a wireless switch used for a wireless network and an access device for a wireless network. An AP device may be used as a wireless base station and may function as a bridge to link a wireless network with a wired network. With this type of AP, wired and wireless networks may be integrated.

The AP may include at least one of a software application or a circuit, to enable other types of nodes in the wireless network to communicate with the outside of the wireless network, as well as the inside of the wireless network through the AP. In some examples, the AP may be a terminal device or a network device equipped with a wireless fidelity (Wi-Fi) chip.

In an example, the STA may include, but is not limited to: a cellular phone, a smart phone, a wearable device, a computer, a personal digital assistant (PDA), a personal communication system (PCS) device, a personal information manager (PIM), a personal navigation device (PND), a global positioning system, a multimedia device, an Internet of Things (IoT) device, etc.

In an example of the present disclosure, the AP and the STA may be devices supporting multi-links. For example, the AP and the STA may be represented as AP MLD and non-AP STA MLD, respectively. For ease of description, an example in which one AP MLD communicates with one non-AP STA MLD in the multi-links (referred to as "multi-link communication") is described in the following. However, the examples of the present disclosure are not limited to this. For example, one AP MLD may perform the multi-link communication with a plurality of non-AP STA MLDs respectively, or one non-AP STA MLD may perform the multi-link communication with different AP MLDs.

In FIG. 1, just as an example, an AP MLD may represent an AP that supports a multi-link communication function, and a non-AP STA MLD may represent a STA that supports the multi-link communication function. Referring to FIG. 1, the AP MLD may work in three links, i.e., the AP MLD may include three secondary APs, that is, AP1, AP2, and AP3 as shown in FIG. 1. The non-AP STA MLD may also work in three links, i.e., the non-AP STA MLD may include three secondary STAs, that is, STA1, STA2, and STA3 as shown in FIG. 1. In the example in FIG. 1, it is assumed that AP1 communicates with STA1 through a corresponding first link, that is, Link 1. Similarly, AP2 and AP3 communicate with STA2 and STA3 through a second link (i.e., Link 2) and a third link (i.e., Link 3), respectively. In addition, Link 1 to Link 3 may be multi-links at different frequencies, for example, links at 2.4 GHz, 5 GHz, and 6 GHz, or several links with the same or different bandwidths at 2.4 GHz, 5 GHz, and 6 GHz. In addition, a plurality of channels may exist in each link. It needs to be understood, however, that the communication scenario shown in FIG. 1 is illustrative, and the idea of the present disclosure is not limited to this. For example, the AP MLD may communicate with the non-AP STA MLD in more or fewer links; or the AP MLD may be linked to a plurality of non-AP STA MLDs; or in each link, the AP may communicate with a plurality of other types of STAs.

The AP MLD may send a traffic indication map (TIM) frame to identify a modification of a BSS parameter. For example, in a case that a critical update occurs to any element within a beacon frame, the AP MLD may increase a value (modulo 256) of a check beacon field in the next TIM frame to be sent. According to an example of the present disclosure, the following events regarding operation parameters of an AP will be classified as critical updates:

a) Inclusion of a Channel Switch Announcement element
b) Inclusion of an Extended Channel Switch Announcement element
c) Modification of the EDCA parameters element
d) Inclusion of a Quiet element
e) Modification of the DSSS Parameter Set
f) Modification of the HT Operation element
g) Inclusion of a Wide Bandwidth Channel Switch element
h) Inclusion of a Channel Switch Wrapper element
i) Inclusion of an Operating Mode Notification element
j) Inclusion of a Quiet Channel element
k) Modification of the VHT Operation element
l) Modification of the HE Operation element
m) Insertion of a Broadcast TWT element
n) Inclusion of the BSS Color Change Announcement element, etc.

In addition, it will be understood that the events shown above are illustrative, and the examples of the present disclosure are not limited to these. Other system information events are also feasible, such as Modification of the EHT Operation element, Modification of the MU EDCA Parameter Set element, Modification of the Spatial Reuse Parameter Set element, Modification of the UORA Parameter Set element, etc.

In an environment that supports the multi-link communication, an AP MLD may cache a downlink data frame for multi-links. As described above, a TIM frame has been used to identify a change in a BSS parameter set, but there is a lack of a technical mechanism for identifying whether a condition that the downlink data frame is cached is carried in the TIM frame, so the TIM frame needs to be enhanced.

Figure 2:
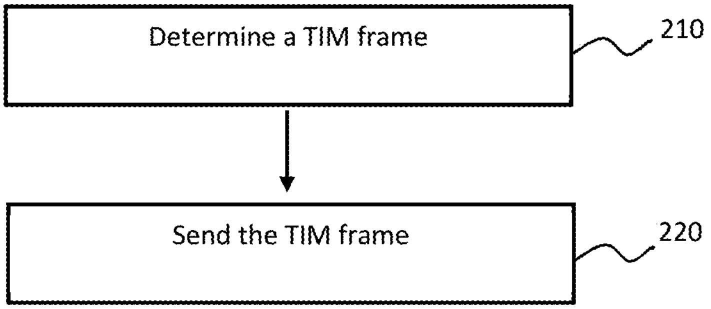
FIG. 2 is a flowchart illustrating a communication method according to an example of the present disclosure.

FIG. 2 is a flowchart illustrating a communication method according to an example of the present disclosure. The communication method as shown in FIG. 2, may be performed by an access point supporting multi-link communication (AP MLD).

Referring to FIG. 2, in step 210, a traffic indication map (TIM) frame is determined in a first link among multi-links. According to an example of the present disclosure, the TIM frame may be configured to identify a condition that a downlink data frame is cached for each of the multi-links. For example, a condition that the downlink data frame is cached for each of the multi-links may be identified in the same field or in different fields of the TIM frame, which will be described in more detail later with reference to Tables 1 to 5 below. According to an example of the present disclosure, the TIM frame may include an ID bit configured to identify the presence of a multi-link traffic element. For example, the multi-link traffic element may be configured to identify a condition that the downlink data frame is cached for some or all of the multi-links.

In step 220, the TIM frame may be sent. For example, the TIM frame may be sent in the first link.

In the examples of the present disclosure, the TIM frame may be at a lightweight level. For example, compared with a beacon frame, which carries a multi-link (ML) information element, various capability information elements, etc., the TIM frame has a length much smaller than a length of the beacon frame, so that a device is more power-efficient during the sending, receiving and/or parsing of the TIM frame.

In an examples of the present disclosure, there may be many ways to determine the TIM frame. For example, the TIM frame may be generated according to at least one of the following conditions: network conditions, load conditions, hardware capabilities of a sending/receiving device, service types, and relevant protocol provisions, which are not limited in the examples of the present disclosure. In the examples of the present disclosure, the TIM frame may also be acquired from an external device, which is not limited in the examples of the present disclosure.

"Multi-links" in step 210 may refer to links established between an AP MLD and an associated non-AP MLD, or links to which a traffic identifier (TID) is mapped. The meanings of the "multi-links" above do not conflict. For example, the "multi-links" may refer to links to which the TID is mapped among the multi-links established between the AP MLD and the associated non-AP MLD. The first link may refer to any of the multi-links and may be configured to send the TIM frame. For ease of description, a link other than the first link among the multi-links may be referred to as "another link" in the following.

According to an example of the present disclosure, the TIM frame may include an ID bit configured to identify the presence of a multi-link traffic element. In other words, a multi-link traffic element may be present in the TIM frame, and that presence may be identified by the ID bit.

For example, the TIM frame may include TIM ID information, and the presence of the multi-link traffic element in the TIM frame may be identified by the ID bit in the TIM ID information.

According to an example of the present disclosure, a condition that a downlink data frame is cached for each of the multi-links may be identified in different fields in the TIM frame. For example, the condition that the downlink data frame is cached for the first link may be included in the TIM ID information, and a condition that the downlink data frame is cached for another link may be included in the multi-link traffic element. In this way, a non-EHT (extreme high-throughput) STA can obtain a condition of caching a downlink data frame by parsing a TIM element, while an EHT-based STA can obtain a condition of caching a downlink data frame for a link where a TIM frame is sent by parsing a TIM element.

According to another example of the present disclosure, a condition that a downlink data frame is cached for each of the multi-links may be identified in the same field (e.g., a multi-link traffic element present in the TIM frame) in the TIM frame. For example, a condition that a downlink data frame is cached for the first link and a condition that the downlink data frame is cached for another link may both be included in the multi-link traffic element. As an example, the TIM frame may have a format as shown in Table 1 below.

TABLE 1

| Format of TIM frame | | | | | | |
|---|---|---|---|---|---|---|
| Category | Unprotected WNM action frame | Check beacon | Time stamp | TIM element | Multi-link traffic element | Other links time stamp |

Referring to Table 1, a Category field may be configured to identify a category of an action frame to which the TIM frame belongs. For example, this field may be set to a specific value (e.g., but is not limited to, "11") to identify an unprotected wireless network management (WNM) action frame. An unprotected WNM action frame field may be set to a specific value (e.g., but is not limited to, "0") to identify the TIM frame. A check beacon field may identify a change in a BSS parameter (a critical update occurs to a beacon frame). The other field messages of the TIM frame in Table 1 are described below in conjunction with the examples of the present disclosure. In addition, an order of various fields shown in Table 1 is illustrative, and the present disclosure is not limited to this. Various changes may be made to Table 1.

As described above, the TIM frame may include TIM ID information. For example, the TIM element in Table 1 may be an example of the TIM ID information. As an example, the TIM ID information (TIM element) may have a format as shown in Table 2 below.

TABLE 2

| Format of TIM element | | | | | |
|---|---|---|---|---|---|
| Element ID | Length | DTIM Count | DTIM Period | Bitmap Control | Partial Virtual Bitmap |

Referring to Table 2, an Element ID field and a Length field may be configured to identify a TIM element and length information of the TIM element.

According to an example of the present disclosure, since the TIM element is included in the TIM frame, a DTIM Count field may include an ID bit configured to identify the presence of a multi-link traffic element. As described in step 210, the ID bit included in the TIM frame to identify the presence of the multi-link traffic element may be included in the TIM ID information (TIM element). The ID bit of the DTIM Count field is used to identify the presence of the multi-link traffic element, which is conducive to correct parsing of the TIM frame by a STA receiving the TIM frame.

A delivery traffic indication map (DTIM) is a special TIM, which may be configured to indicate that cached broadcast and multicast frames are about to be transmitted. A DTIM Period field may indicate a number of intervals of beacon frames between two DTIM frames, and a value of 0 in number may be reserved and unused. According to an example of the present disclosure, the DTIM Period field may also be omitted from Table 2.

A Bitmap Control field and a Partial Virtual Bitmap field may be configured to identify information about an association identifier (AID) of a non-AP STA MLD associated with an AP MLD. In this case, the AP MLD may cache a downlink data frame for the non-AP STA MLD corresponding to the AID.

In an example in which a condition that a downlink data frame is cached for each of the multi-links may be identified in different fields in the TIM frame, the TIM ID information (TIM element) may identify a condition that the downlink data frame is cached for the first link. For example, the condition that the downlink data frame is cached for the first link may be identified by the Bitmap Control field and the Partial Virtual Bitmap field of the TIM element in Table 2. For example, in a case that an AID indicated by the Bitmap Control field and the Partial Virtual Bitmap field corresponds to a STA in the first link, it may indicate that there is a downlink data frame cached for this STA.

The DTIM Count field in Table 2 may identify the presence of the multi-link traffic element in the TIM frame, that is, as shown in Table 1, the TIM frame may include the multi-link traffic element.

In an example in which a condition that a downlink data frame is cached for each of the multi-links may be identified in different fields in the TIM frame, the multi-link traffic element may identify a condition that a downlink data frame is cached for another link other than the first link among the multi-links. In addition, in an example in which a condition that a downlink data frame is cached for each of the multi-links may be identified in the same field in the TIM frame, the multi-link traffic element may identify a condition that the downlink data frame is cached for each of the multi-links. A detailed description may be made below by reference to Tables 3 to 5.

As an example, the multi-link traffic element may have a format as shown in Table 3 below.

TABLE 3

| Format of multi-link traffic element | | | | |
|---|---|---|---|---|
| Element ID | Length | Element ID Extension | Multi-Link Traffic Control | Pre-Link Traffic Indication List |

Referring to Table 3, an Element ID field, a Length field, and an Element ID Extension field may be configured to identify a multi-link traffic element, as well as length and extension information of the multi-link traffic element.

The Multi-Link Traffic Control field in Table 3 may be configured to identify information about an association identifier (AID) of a non-AP STA MLD associated with an AP MLD. For example, but is not exclusively, the Multi-Link Traffic Control field may have a format as shown in Table 4 below.

TABLE 4

| Format of Multi-Link Traffic Control Field | | |
|---|---|---|
| Bitmap Size | AID Offset | Reserved |

Figure 4:
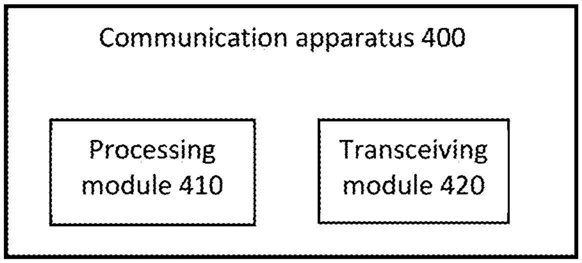
FIG. 4 is a block diagram illustrating a communication apparatus according to an example of the present disclosure.

Referring to FIG. 4, a Bitmap Size subfield may indicate a size of each subfield (e.g., a Per-Link Traffic Indication Bitmap subfield in Table 5 below) in a Per-LinkTraffic Indication List field in Table 3, in a unit of bits. For example, the Bitmap Size subfield may be encoded as m, where (m+1) is a size of the Per-Link Traffic Indication Bitmap subfield, and a value of 0 in the Bitmap Size subfield may be reserved.

An AID Offset subfield in Table 4 may be configured to identify an AID of a non-AP STA MLD. In the examples of the present disclosure, the AP MLD may cache a downlink data frame for a non-AP STA MLD corresponding to the AID identified by this subfield. For example, a value of the AID Offset subfield may correspond to a Partial Virtual Bitmap subfield in the TIM element described in Table 2 above. In addition, Table 4 may also have at least 1 bit reserved and unused.

Since the AID of the non-AP STA MLD indicated by the AID Offset subfield is at a multi-link device level (MLD level), a condition that the AP MLD caches the downlink data frame for a single link for the non-AP STA MLD may be identified in the Per-Link Traffic Indication List field in Table 3, where the Per-Link Traffic Indication List field may have a format as shown in Table 5 below.

TABLE 5

| Format of Per-Link Traffic Indication List field | | | |
|---|---|---|---|
| Per-Link Traffic Indication Bitmap 1 | . . . | Pre-Link Traffic Indication Bitmap n | Padding |

Figure 5:
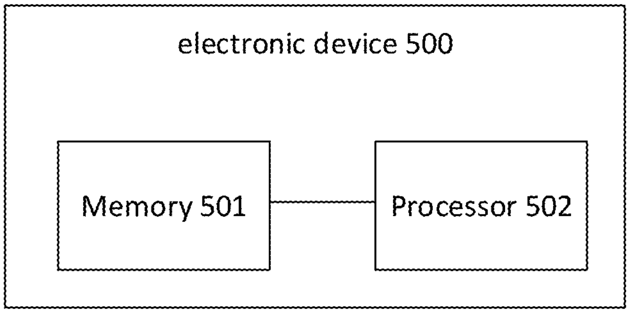
FIG. 5 is a block diagram illustrating an electronic device according to an example of the present disclosure.

Referring to FIG. 5, the Per-Link Traffic Indication List field may have n Per-Link Traffic Indication Bitmap subfields, and each of the Per-Link Traffic Indication Bitmap subfield may have (m+1) bits, as mentioned above.

In an example of the present disclosure, in a case that a condition that a downlink data frame is cached for the first link is identified in the TIM element described with reference to Table 2, the multi-link traffic element may identify a condition that a downlink data frame is cached for another link other than the first link among the multi-links. For example, the number of the Per-Link Traffic Indication Bitmap subfields in Table 4 may be 1 less than the number of all the multi-links. For example, referring to FIG. 1, in a case that the first link is Link1 and the number of the multi-links is 3, Table 2 may identify the condition that the downlink data frame is cached for the first link Link1, and Table 5 may include two Per-Link Traffic Indication Bitmap subfields, and the two Per-Link Traffic Indication Bitmap subfields may respectively identify whether the AP MLD caches the downlink data frame for Link2 and Link3. For example, in a case where the non-AP STA MLD associated with the AP MLD can support up to 16 links, the first link may be one of the 16 links, and Table 2 may identify the condition that the downlink data frame is cached for the first link, and Table 5 may include 15 Per-Link Traffic Indication Bitmap subfields, and each of the Per-Link Traffic Indication Bitmap subfields may respectively identify whether the AP MLD caches the downlink data frame for corresponding link among the other 15 links.

In another example of the present disclosure, the multi-link traffic element may identify the condition that the downlink data frame is cached for each of the multi-links (i.e., the condition that the downlink data frame is cached for each of the multi-links may be identified in the same field in the TIM frame). In this example, the number of the Per-Link Traffic Indication Bitmap subfields in Table 5 may correspond to the number of all the multi-links. For example, as shown in FIG. 1, in a case that the number of the multi-links is 3, Table 5 may include three Per-Link Traffic Indication Bitmap subfields, and each of the Per-Link Traffic Indication Bitmap subfield may respectively identify whether the AP MLD caches the downlink data frame for the corresponding link. For example, in a case where the non-AP STA MLD associated with the AP MLD can support up to 16 links, the multi-link traffic element may identify the condition that the downlink data frame is cached for each of the multi-links, and Table 5 may include 16 Per-Link Traffic Indication Bitmap subfields, and each of the Per-Link Traffic Indication Bitmap subfield may respectively identify whether the AP MLD caches the downlink data frame for the corresponding link.

According to an example of the present disclosure, in a case that the condition that the downlink data frame is cached for all the multi-links is identified using the multi-link traffic element, the AID offset (Table 4) is the same for each link, and the EHT STA merely needs to parse the multi-link traffic element, without parsing the TIM element.

Continued to referring to FIG. 1, for example, the TIM frame may also include time stamp information for the first link, such as a Time stamp field in Table 1. According to an example of the present disclosure, the Time stamp field may indicate a time synchronization function (TFS) timer for the first link, while the time for the other links may be adjusted according to an offset value of the TFS. The offset value may, for example, be carried in a reduced neighbor report element (RNRE).

For example, the TIM frame may also include time stamp information for another link other than the first link among the multi-links, such as the Other Links Time Stamp field in Table 1. According to an example of the present disclosure, the Other links Time stamp field may be configured for a STA in a power-saving (PS) state to perform time synchronization.

It will be understood that the format of the TIM frame, as shown in Table 1, is illustrative, and the present disclosure is not limited to this. For example, some fields may be omitted from Table 1, or other fields may also be included in Table 1. For example, the Other links Time stamp field may be omitted from Table 1. For another example, the TIM frame may also include a timing offset configured to identify time information for another link other than the first link among the multi-links. In addition, the time information for other links may not be included in the TIM frame (e.g., the Other links Time stamp field or the timing offset field may not be included), but a timing offset of DTIM may be carried in information of the other frames. For example, the timing offset of the DTIM may be carried in a RNRE information element of a beacon frame.

According to an example of the present disclosure, the TIM frame contains a Multi-link traffic element, and the Multi-link traffic element may identify a condition that the downlink data frame is cached for each link to which a TID is mapped, where the TIM frame containing the Multi-link traffic element may be identified using the DTIM count field in the TIM element. For example, the TIM frame contains the TIM element. In this way, a legacy STA which does not support the multi-link communication may obtain the cached downlink data frame through the TIM element, increasing the compatibility of a communication system.

In addition, according to an example of the present disclosure, a Time stamp may identify time stamp information for a link (first link) in which the TIM frame is sent. In an example, the TIM frame may contain the Other links Time stamp for other links, where the Other links Time stamp for other links may, for example, but is not limited to, appear behind the Multi-link traffic element field, and the Other links Time stamp for other links may have a length up to 15 bytes. In an example, the TIM frame may carry a timing offset, instead of the time stamp information for other links.

Figure 3:
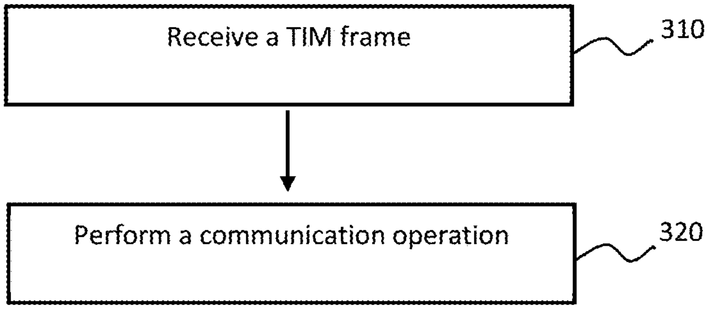
FIG. 3 is a flowchart illustrating a communication method according to an example of the present disclosure.

FIG. 3 is a flowchart illustrating a communication method according to an example of the present disclosure. The communication method as shown in FIG. 3 may be performed by a station supporting multi-link communication (non-AP STA MLD).

Referring to FIG. 3, in step 310, a traffic indication map (TIM) frame is received in a first link among multi-links. The TIM frame may include an ID bit configured to identify the presence of a multi-link traffic element. The TIM frame may be configured to identify a condition that a downlink data frame is cached for each of the multi-links. For example, a secondary STA of the non-AP STA MLD corresponding to the first link may receive the TIM frame. The TIM frame may be similar to that in the example described in Table 1. According to an example of the present disclosure, the TIM frame may include TIM ID information. The TIM ID information may identify a condition that the downlink data frame is cached for the first link. Moreover, the TIM ID information may include an ID bit configured to identify the presence of a multi-link traffic element in the TIM frame. Examples of the TIM ID information may be similar to the description in Table 2 above. For the sake of brevity, repeated descriptions are omitted.

According to an example of the present disclosure, the multi-link traffic element may identify a condition that a downlink data frame is cached for another link other than the first link among the multi-links. According to an example of the present disclosure, the multi-link traffic element may identify a condition that a downlink data frame is cached for each of the multi-links. Examples of the multi-link traffic element may be similar to the description in Table 3 to Table 5 above. For the sake of brevity, repeated descriptions are omitted.

According to an example of the present disclosure, the TIM frame may further include time stamp information for the first link. According to an example of the present disclosure, the TIM frame may further include time stamp information for another link other than the first link among the multi-links. According to an example of the present disclosure, the TIM frame may further include a timing offset for identifying time information for another link other than the first link among the multi-links. Each time stamp or timing offset may refer to the examples described in Table 1 above. For the sake of brevity, the repeated descriptions are omitted.

According to an example of the present disclosure, in a case that the TIM frame does not include time stamp information or timing offset for other links, a non-AP STA MLD may obtain time information on clock synchronization for other links, e.g., a timing offset of a beacon frame for each link (e.g., a timing offset of DTIM), from the information of other frames (e.g., from a RNRE information element of a previously received beacon frame). In this example, the communication method shown in FIG. 3 may further include (not shown): obtaining time information on clock synchronization for another link other than the first link among the multi-links from other message frames.

In step 320, a communication operation is performed based on the TIM frame. For example, a secondary STA of the non-AP STA MLD corresponding to the first link may receive the TIM frame, and a condition of data caching for this link (first link) and other links belonging to the non-AP STA MLD may be obtained by parsing the TIM frame. In a case that corresponding STA obtains through the TIM frame that the cached downlink data frame is present in this link or other links, the corresponding STA may receive the cached downlink data frame.

The communication method according to the examples of the present disclosure enables a non-AP STA MLD to listen for a TIM frame, so as to obtain a condition that a data frame is cached for each link. In addition, the TIM frame is smaller in length (e.g., much smaller in length than the beacon frame), which makes the device more power-efficient.

FIG. 4 is a block diagram illustrating a communication apparatus 400 according to an example of the present disclosure.

Referring to FIG. 4, the communication apparatus 400 may include a processing module 410 and a transceiving module 420. The communication apparatus as shown in FIG. 4 may be applied to an AP MLD or a non-AP STA MLD.

In a case where the communication apparatus shown in FIG. 4 is applied to an AP MLD, the processing module 410 may be configured to determine a traffic indication map (TIM) frame in a first link among multi-links. The TIM frame may include an ID bit configured to identify the presence of a multi-link traffic element. The TIM frame may be configured to identify a condition that a downlink data frame is cached for each of the multi-links. The transceiving module 420 may be configured to send the TIM frame. In this case, the communication apparatus 400 may perform the communication method described with reference to FIG. 2. For the sake of brevity, repeated descriptions are omitted.

In a case where the communication apparatus shown in FIG. 4 is applied to a non-AP STA MLD, the transceiving module 420 may be configured to receive a traffic indication map (TIM) frame in a first link among multi-links. The TIM frame may include an ID bit configured to identify the presence of a multi-link traffic element. The TIM frame may be configured to identify a condition that a downlink data frame is cached for each of the multi-links. The processing module 410 may be configured to control the execution of a communication operation based on the TIM frame. In this case, the communication apparatus 400 may perform the communication method described with reference to FIG. 3. For the sake of brevity, repeated descriptions are omitted. For example, the processing module 410 may parse the TIM frame received in the first link, or control the transceiving module 420 to receive the downlink data frame cached for each link, according to a TAM frame parsing result.

In addition, the communication apparatus 400 shown in FIG. 4 is illustrative, and the examples of the present disclosure are not limited to this. For example, the communication apparatus 400 may also include other modules, such as a memory module. Moreover, the individual modules in the communication apparatus 400 may be combined into more complex modules or may be divided into more individual modules.

The communication method and the communication apparatus according to the examples of the present disclosure enable a non-AP STA MLD to listen for a TIM frame, so as to obtain a condition that a data frame is cached for each link, which makes the device more power-efficient.

Based on the same principle as the method provided in the examples of the present disclosure, an example of the present disclosure further provides an electronic device 500 as shown in FIG. 5. The electronic device 500 includes one or more processors 502 and a memory 501. The memory 501 is configured to store machine-readable instructions (which may also be referred to as a "computer program"). The one or more processors 502 are collectively configured to execute the machine-readable instructions to implement the method described with reference to FIG. 2 and FIG. 3.

An example of the present disclosure further provides a non-transitory computer-readable storage medium configured to store a computer program. The computer program, when executed by one or more processors, causes the one or more processors to collectively implement the method described with reference to FIG. 2 and FIG. 3.

In an example, the one or more processors may be collectively configured to implement or execute various illustrative logic boxes, modules, and circuits described in conjunction with the present disclosure. The one or more processors may be a central processing unit (CPU), a universal processor, a digital signal processor (DSP), an application-specific integrated circuit (ASIC), a programmable gate array (FPGA), or other programmable logic devices, transistor logic devices, hardware components, or any combinations of the above. The processor may also be a combination that implements a computing function, such as a combination of one or more microprocessors, a combination of a DSP and a microprocessor, etc.

In an example, the memory may be, for example, a read-only memory (ROM), a random access memory (RAM), an electrically erasable programmable read only memory (EEPROM), a compact disc read only memory (CD-ROM) or other optical disc storage, optical disk storage (including a compact disk, a laser disk, an optical disk, a digital general disk, a Blu-ray disk, etc.), a magnetic disc storage medium or other magnetic storage devices, or any other medium which can be configured to carry or store program codes in the form of instructions or data structures and can be accessed by a computer, but is not limited this.

It should be understood that although the various steps in the flowchart of the accompanying drawings are sequentially displayed as indicated by arrows, these steps are not necessarily performed in the order indicated by the arrows. Except as explicitly stated, the execution of these steps is not strictly limited and may be performed in other sequences. Moreover, at least some of the steps in the flowchart of the accompanying drawings may include a plurality of sub-steps or stages, which are not necessarily performed at the same time, but may be executed at different times. The execution order of these sub-steps or stages is also not necessarily performed sequentially, but may be performed in turn or alternately with at least a portion of other steps or sub-steps or stages of other steps.

Although the present disclosure has been shown and described with reference to some examples of the present disclosure, those skilled in the art will understand that various changes in form and detail may be made without departing from the scope of the present disclosure. The scope of the present disclosure shall not be limited to being restricted to examples of the present disclosure, but rather by the appended claims and their equivalents.

The invention claimed is:

1. A communication method, comprising:

determining a traffic indication map (TIM) frame in a first link among multi-links, wherein the TIM frame comprises an identifier (ID) bit configured to identify a presence of a multi-link traffic element, the TIM frame is configured to identify a condition that a downlink data frame is cached for each of the multi-links, and the multi-link traffic element identifies a condition that the downlink data frame is cached for each of the multi-links; and sending the TIM frame.

2. The communication method according to claim 1, wherein the TIM frame further comprises time stamp information for the first link.

3. The communication method according to claim 1, wherein the TIM frame further comprises time stamp information for other links other than the first link among the multi-links.

4. The communication method according to claim 1, wherein the TIM frame further comprises a timing offset for identifying time information for other links other than the first link among the multi-links.

5. An electronic device, comprising a memory, one or more processors, and a computer program stored in the memory and runnable on the one or more processors, wherein the computer program, when executed by the one or more processors, causes the one or more processors to collectively perform a method comprising:

determining a traffic indication map (TIM) frame in a first link among multi-links, wherein the TIM frame comprises an identifier (ID) bit configured to identify a presence of a multi-link traffic element, the TIM frame is configured to identify a condition that a downlink data frame is cached for each of the multi-links, and the multi-link traffic element identifies a condition that the downlink data frame is cached for each of the multi-links; and sending the TIM frame.

6. A non-transitory computer-readable storage medium, storing a computer program, wherein the computer program, when executed by one or more processors, causes the one or more processors to collectively perform the method according to claim 1.

7. A communication method, comprising:

receiving a traffic indication map (TIM) frame in a first link among multi-links, wherein the TIM frame comprises an identifier (ID) bit configured to identify a presence of a multi-link traffic element, the TIM frame is configured to identify a condition that a downlink data frame is cached for each of the multi-links, and the multi-link traffic element identifies a condition that the downlink data frame is cached for each of the multi-links; and performing a communication operation based on the TIM frame.

8. The communication method according to claim 7, wherein the TIM frame further comprises time stamp information for the first link.

9. The communication method according to claim 7, wherein the TIM frame further comprises time stamp information for other links other than the first link among the multi-links.

10. The communication method according to claim 7, wherein the TIM frame further comprises a timing offset for identifying time information for other links other than the first link among the multi-links.

11. The communication method according to claim 7, wherein the communication method further comprises: obtaining time information on clock synchronization for other links other than the first link among the multi-links from other message frame.

12. An electronic device, comprising a memory, one or more processors, and a computer program stored in the memory and runnable on the one or more processors, wherein the computer program, when executed by the one or more processors, causes the one or more processors to collectively perform the method according to claim 7.

13. A non-transitory computer-readable storage medium, storing a computer program, wherein the computer program, when executed by one or more processors, causes the one or more processors to collectively perform the method according to claim 7.

* * * * *